(12) United States Patent
Suvernev et al.

(10) Patent No.: US 8,180,745 B2
(45) Date of Patent: May 15, 2012

(54) PERSISTENT OBJECT REFERENCES TO PARALLEL DATABASE CONTAINERS

(75) Inventors: Andrei Suvernev, Palo Alto, CA (US);
Thorsten Glebe, Leimen (DE)

(73) Assignee: SAP AG, Walldorf (DE)

( * ) Notice: Subject to any disclaimer, the term of this patent is extended or adjusted under 35 U.S.C. 154(b) by 1028 days.

(21) Appl. No.: 11/641,277

(22) Filed: Dec. 19, 2006

(65) Prior Publication Data

US 2008/0147724 A1 Jun. 19, 2008

(51) Int. Cl.
*G06F 17/00* (2006.01)
*G06F 7/00* (2006.01)
(52) U.S. Cl. ........................................ 707/696; 711/113
(58) Field of Classification Search .................. 707/696, 707/999.101; 711/113
See application file for complete search history.

(56) References Cited

U.S. PATENT DOCUMENTS

| | | | |
|---|---|---|---|
| 6,912,520 B2* | 6/2005 | Hankin et al. | 707/1 |
| 7,062,512 B1* | 6/2006 | Kirkpatrick | 709/213 |
| 2004/0199521 A1* | 10/2004 | Anglin et al. | 707/100 |
| 2008/0086470 A1* | 4/2008 | Graefe | 707/8 |

* cited by examiner

*Primary Examiner* — Kimberly Lovel
(74) *Attorney, Agent, or Firm* — Buckley, Maschoff & Talwalkar LLC

(57) ABSTRACT

A system to create a first database object in the object-oriented database, the first database object associated with a primary key, a first group ID m, and a first delta ID m, associate a first pointer with the first database object, create a second database object in the object-oriented database, the second database object associated with the primary key, a second group ID n, and a second delta ID n, associate a second pointer with the second database object, and create a third database object in the object-oriented database, the third database object associated with the primary key, the first group ID m, and a third delta ID m+1. The third database object is associated with a change to the first database object.

34 Claims, 10 Drawing Sheets

US 8,180,745 B2

PERSISTENT OBJECT REFERENCES TO PARALLEL DATABASE CONTAINERS

FIELD

Some embodiments relate to management of database objects within a database system. In particular, some embodiments concern referencing database objects using object identifiers as well as primary keys.

BACKGROUND

A database typically organizes data using primary keys. Generally, a primary key consists of one or more data fields of an object whose values are used to reference the object. Any object needing to reference a first object therefore includes the primary key of the first object. Since primary keys may occupy a significant number of bytes, an amount of memory devoted to primary key storage may quickly become unacceptable.

To illustrate the foregoing, a modern supply chain management system is considered. Such a system may receive an order and determine whether goods are available for delivery as requested by the order. In order to avoid committing the goods to multiple orders received in parallel, the goods are temporarily reserved until the order is stored or canceled. Such a reservation will be referred to as a Temporary Quantity Assignment (TQA).

TQAs of different transactions may be stored persistently in a database container according to a product-location ID associated with a requested good and a transaction ID identifying an associated order. The product-location ID and the transaction ID comprise the primary key of each TQA. To delete all TQAs associated with a given order once the order is stored or canceled, the TQAs are first identified using primary keys associated with the order. Construction of the primary keys may be facilitated by a stored administration structure associating each transaction ID with its associated product-location IDs.

The size of the administration structure may be reduced by referencing each primary key (i.e., each TQA object) using a small object of fixed size, hereinafter referred to as an OID. Accordingly, the administration structure needs only to associate each transaction ID with the OID of each TQA that is associated with the transaction.

Conventional systems are unable to efficiently integrate the above-described dual referencing of objects (i.e., by primary key and by OID) into their object management model. For example, conventional systems lack suitable mechanisms for providing parallel access, modification, and/or "consistent views" of dual-referenced objects.

DETAILED DESCRIPTION

Figure 1:
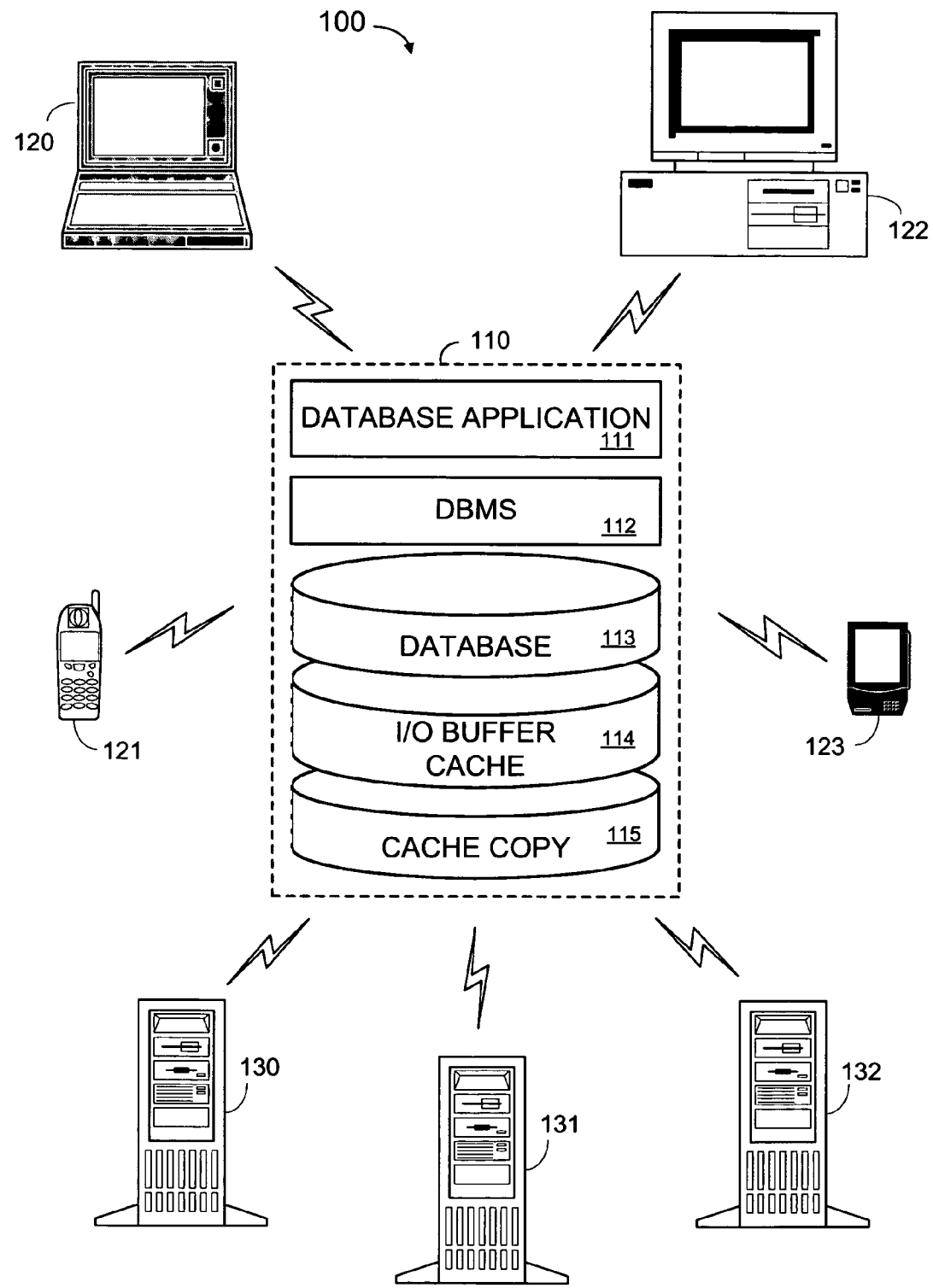
FIG. 1 is a block diagram of a hardware architecture according to some embodiments.

FIG. 1 is a block diagram of system 100 according to some embodiments. System 100 illustrates a client-server database environment including application/database server 110, client devices 120 through 123, and data sources 130 through 132. Other system topologies may be used in conjunction with other embodiments.

Server 110 may operate to receive, store, manage and provide data. Such data may be received from sources such as data sources 130 through 132 and/or generated by server 110. The data may be provided to client devices 120 through 123 in response to requests received therefrom. Server 110 of system 100 includes database application 111, database management system (DBMS) 112, database 113, input/output (I/O) buffer cache 114 and cache copy 115.

Database application 111 may provide order fulfillment, business monitoring, inventory control, online shopping, and/or any other suitable functions via interactions with other elements of server 110. According to some embodiments, database application 111 communicates with DBMS 112 over one or more interfaces provided by DBMS 112. Database application 111 may, in turn, support client applications executed by client devices 120 through 123.

Such a client application may simply comprise a Web browser to access and display reports generated by database application 111. In this regard, server 110 may comprise a Web server to manage interactions with client devices 120 through 123.

DBMS 112 may comprise any system for managing a database instance that is or becomes known. Generally, DBMS 112 may receive requests for data (e.g., Structured Query Language (SQL) requests from database application 111), may retrieve requested data from database 113, and may return the requested data to the requester. DBMS 112 may also perform start-up, logging, recovery, management, optimization, monitoring and other database-related tasks. DBMS 112 may operate to delete a data volume from database 113 according to some embodiments described herein.

Database 113 may comprise one or more disparate systems for storing data, therefore DBMS 122 may comprise one or more systems for retrieving stored data. According to some embodiments, database 113 is implemented as any suitable collection of data that may be accessed by a computer program to select particular data from the collection.

The data of database 113 may include data records and associated index entries (i.e. application data), as well as configuration files, database parameters, paths, user information and any other suitable information. In some embodiments, database 113 is an element of an Online Transaction Processing (OLTP) database instance. An OLTP database instance may be suited for processing individual transactions quickly within an environment consisting of a large number of users and a large database.

During database execution, various elements of the database are stored in I/O buffer cache 114. These elements may include recently-accessed pages of application data, converter pages, database catalog objects and/or a log queue. Cache copy 115 comprises a copy of all or a portion of cache 114. Cache copy 115 may comprise a liveCache™ database instance that facilitates object-oriented manipulation of the copied cache data.

For example, cache copy 115 may store copies of some or all of the data within instances of object-oriented (e.g., C++) classes. Such instances may be referred to as database objects, and may be stored persistently in main memory (e.g., random access memory) according to some conventional database systems. Cache copy 115 will be described in further detail below with respect to FIG. 2.

Server 110 may include other unshown elements that may be used during operation thereof, such as any suitable program code, scripts, or other functional data that is executable to interface with other elements of system 100, other applications, other data files, operating system files, and device drivers. These elements are known to those skilled in the art, and are therefore not described in detail herein.

Data sources 130 through 132 may comprise any sources of any data that may provide data to server 110. The data may be pushed to server 100 and/or provided in response to queries received therefrom. One or more of data sources 130 through 132 may comprise a back-end data environment employed in a business or industrial context. Data sources 130 through 132 may therefore comprise many disparate hardware and software systems, some of which are not interoperational with one another.

Two or more of the elements of system 100 may be located remote from one another and may communicate with one another via a network and/or a dedicated connection. Moreover, each displayed element of system 100 may comprise any number of hardware and/or software elements, some of which are located remote from each other.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 2:
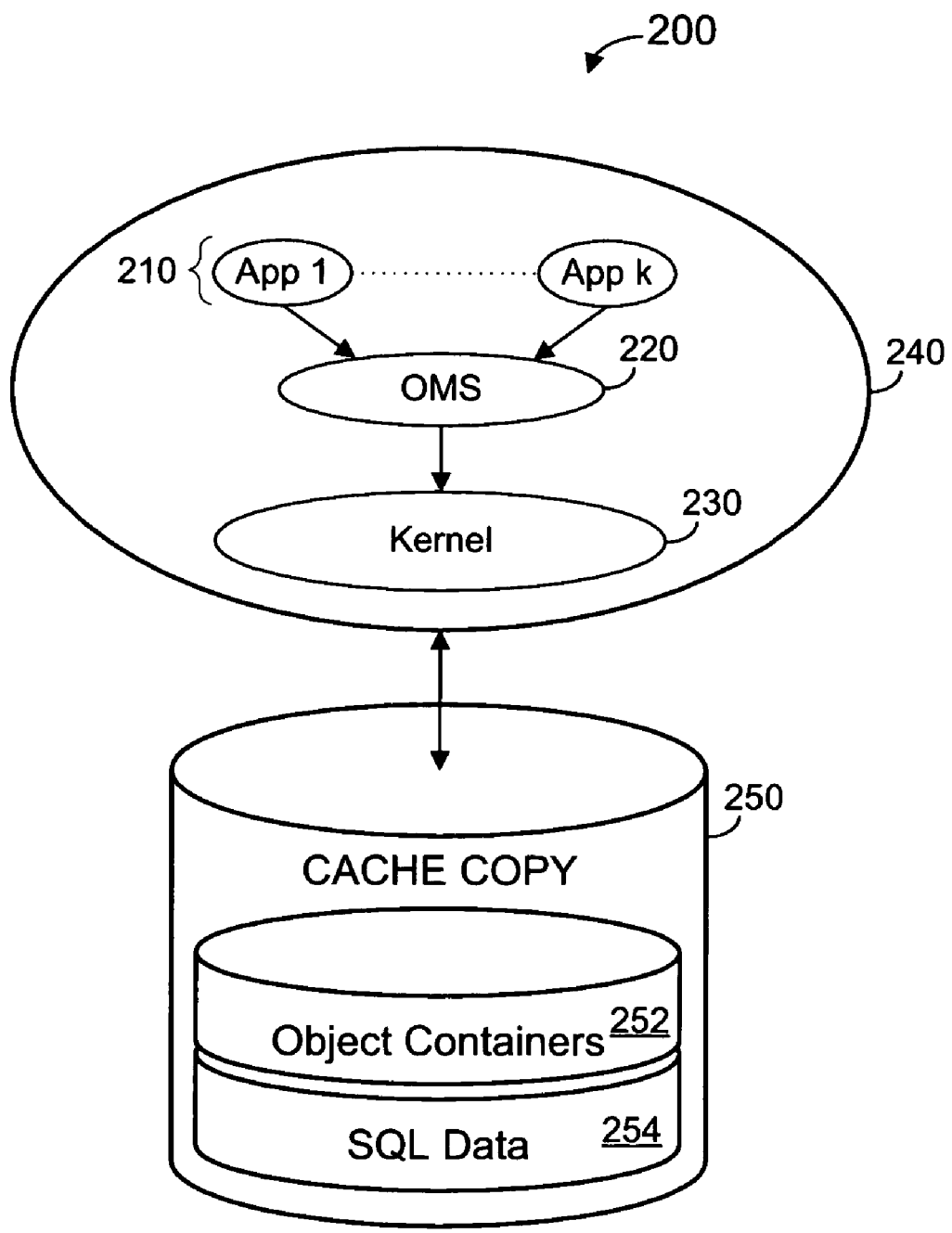
FIG. 2 is a block diagram of a database system according to some embodiments.

An SAP liveCache® database instance may provide a data cache of persistent database objects as described above. Such database objects are managed by an Object Management System (OMS). An OMS may be implemented as an object-oriented library (i.e., liboms) that is linked to a liveCache kernel. FIG. 2 illustrates elements of liveCache database instance 200 in which some embodiments may be implemented.

Application logic written in object-oriented code is built into application libraries 210 against OMS liboms 220 and kernel 230. Application libraries 210, OMS liboms 220, and kernel 230 may comprise "executable" 240 that executes within a common address space. Executable 240 may comprise an element of DBMS 112 of FIG. 1, and may comprise any system for managing a database instance that is or becomes known.

Libraries 210 contain routines that may be called as database procedures by external workprocesses. The routines provided by application libraries 210 allow an external workprocess to create, modify and delete persistent database objects. OMS 220 operates in conjunction with libraries 210 to manage the persistent database objects and may also perform optimization, monitoring and other database-related tasks. OMS 220 may provide libraries 210 with parallel access to dual-referenced persistent objects as described herein.

Database 250 may comprise an implementation of cache copy 115 of FIG. 1. Database 250 stores persistent database objects within class-specific object containers 252. As shown in FIG. 2, database 250 may also store Structured Query Language (SQL) data 254 to be accessed by executable 240.

Figure 3:
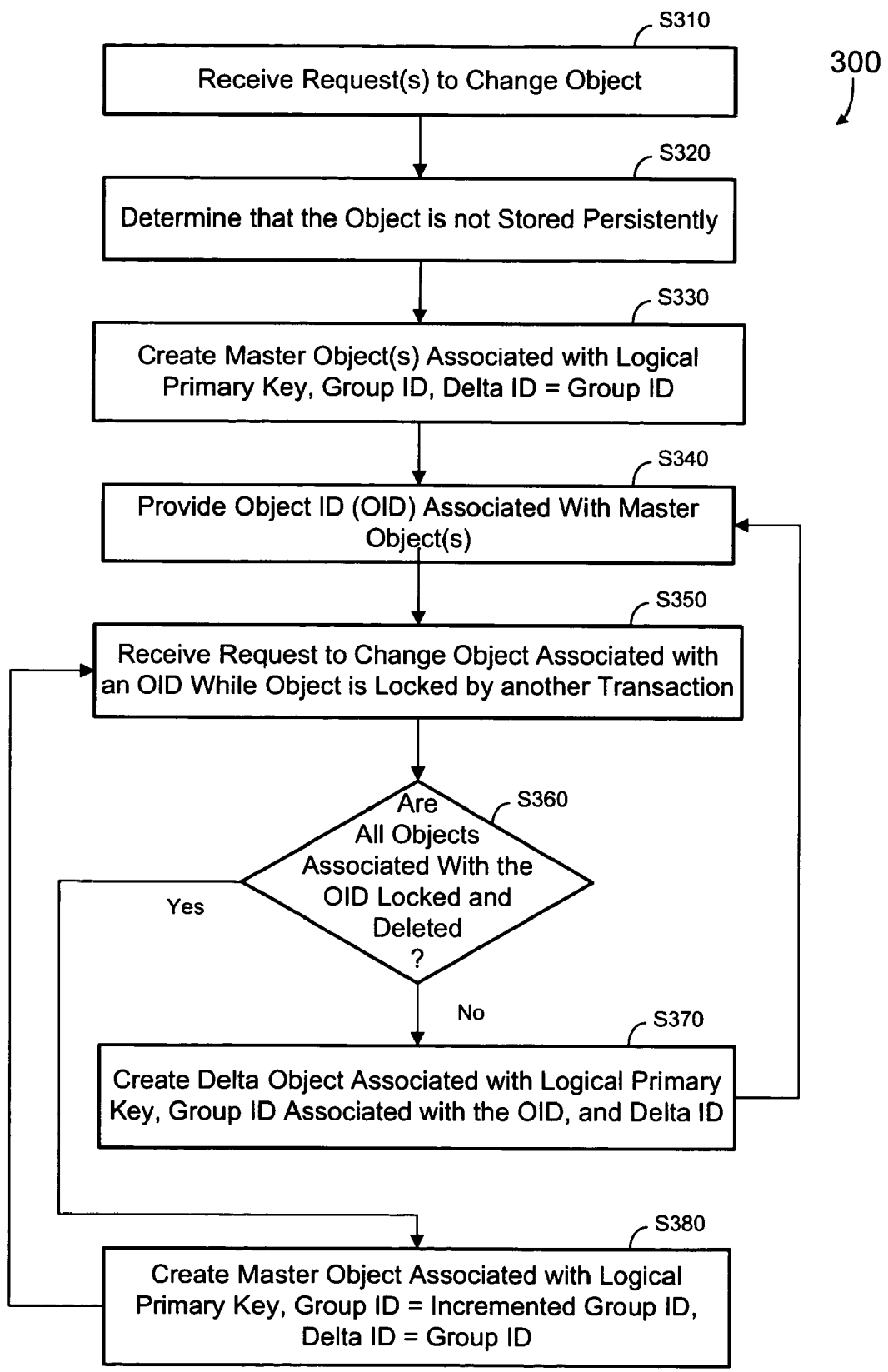
FIG. 3 is a flow diagram of program code according to some embodiments.

FIG. 3 is a flow diagram of process 300 according to some embodiments. Some embodiments of process 300 may provide creation of multiple master objects associated with a particular primary key. In some embodiments, each master object is associated with a single OID and with any number of delta objects associated with changes to its master object. Server 110 may execute program code of OMS 220 to perform process 300 according to some embodiments.

Process 300 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S310, one or more requests to change a database object are received. The one or more requests may comprise a single request or two or more requests received substantially simultaneously. The request(s) may be received from one or more of application libraries 210 as a result of procedure calls received thereby, and may include a primary key identifying the object of interest.

It is determined that the object is not stored persistently at S320. Such a determination may proceed by any process that is or becomes known. In some embodiments of S320, OMS 220 checks the primary key of the object against a database catalog including information regarding the status of database objects.

A master object is created for each received request at S330 after it is determined that the object is not stored persistently. Each master object is associated with the primary key of the object, a group identifier (group ID) and a delta identifier (delta ID) equal to the group ID. OMS 220 also associates a pointer with each created object. A master object may therefore be accessed by de-referencing its associated pointer.

Figure 4:
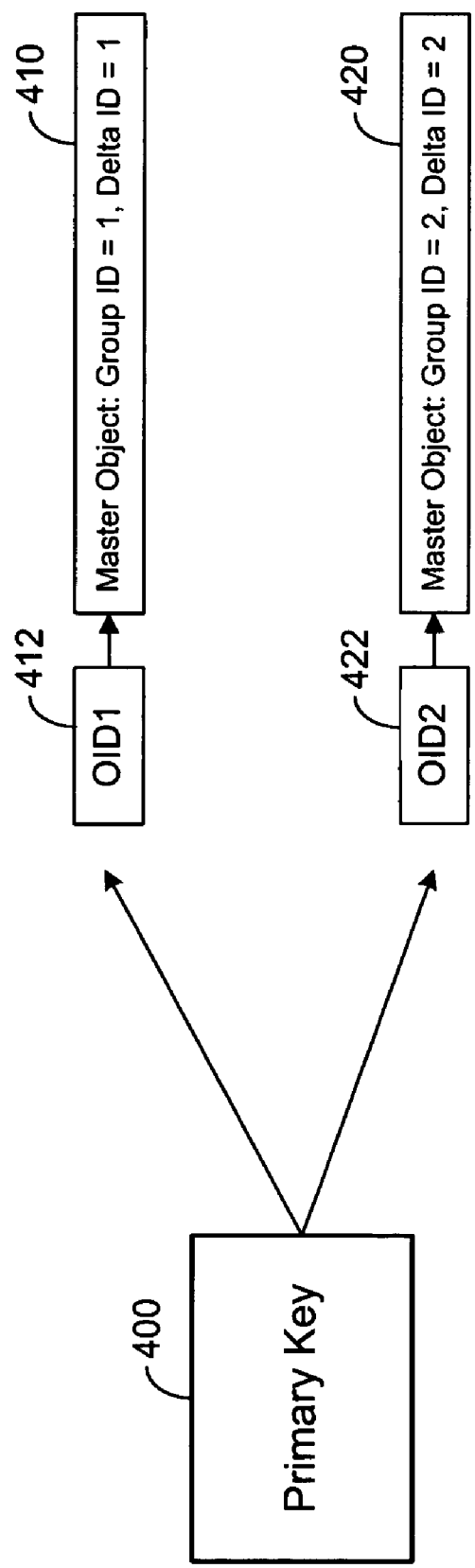
FIG. 4 illustrates relationships between a primary key, OIDs, master objects and delta objects according to some embodiments.

FIG. 4 is a diagram illustrating relationships between the elements mentioned above according to some embodiments. Primary key 400 represents a primary key of an object for which the request(s) were received at S310. Master objects 410 and 420 were created at S330, as were respective pointers 412 and 422 to master objects 410 and 420. Only master object 410 would be created in a case that only one request was received at S310.

The generated OIDs are provided at S340. The OIDs may be provided to OMS 220 by kernel 230 and/or provided by OMS 220 to application libraries 210. Like a primary key, the provided OIDs may be used to request changes to the object associated therewith.

A request to change an object associated with an OID is received S350. The request may be received from a transaction via application libraries 210. According to the present example, the request is received while the object is locked by another transaction. Next, at S360, it is determined whether all objects associated with the OID are locked and deleted. Such a determination may be based on a system implemented by OMS 220 to provided shared and/or exclusive access to persistent database objects.

If the determination is negative, a delta object associated with the OID is created at S370. The delta object is associated with the primary key associated with the OID, the group ID associated with the OID, and a delta ID equal to the group ID. The delta object reflects or is otherwise associated with the requested change to its master object. Flow then returns to S350 to receive another request to change an object associated with an OID.

Process 300 may cycle between S350, S360, and S370 to create one or more delta objects corresponding to one or more of the provided OIDs. The delta ID is incremented for each newly-created delta object associated with an OID.

Figure 5:
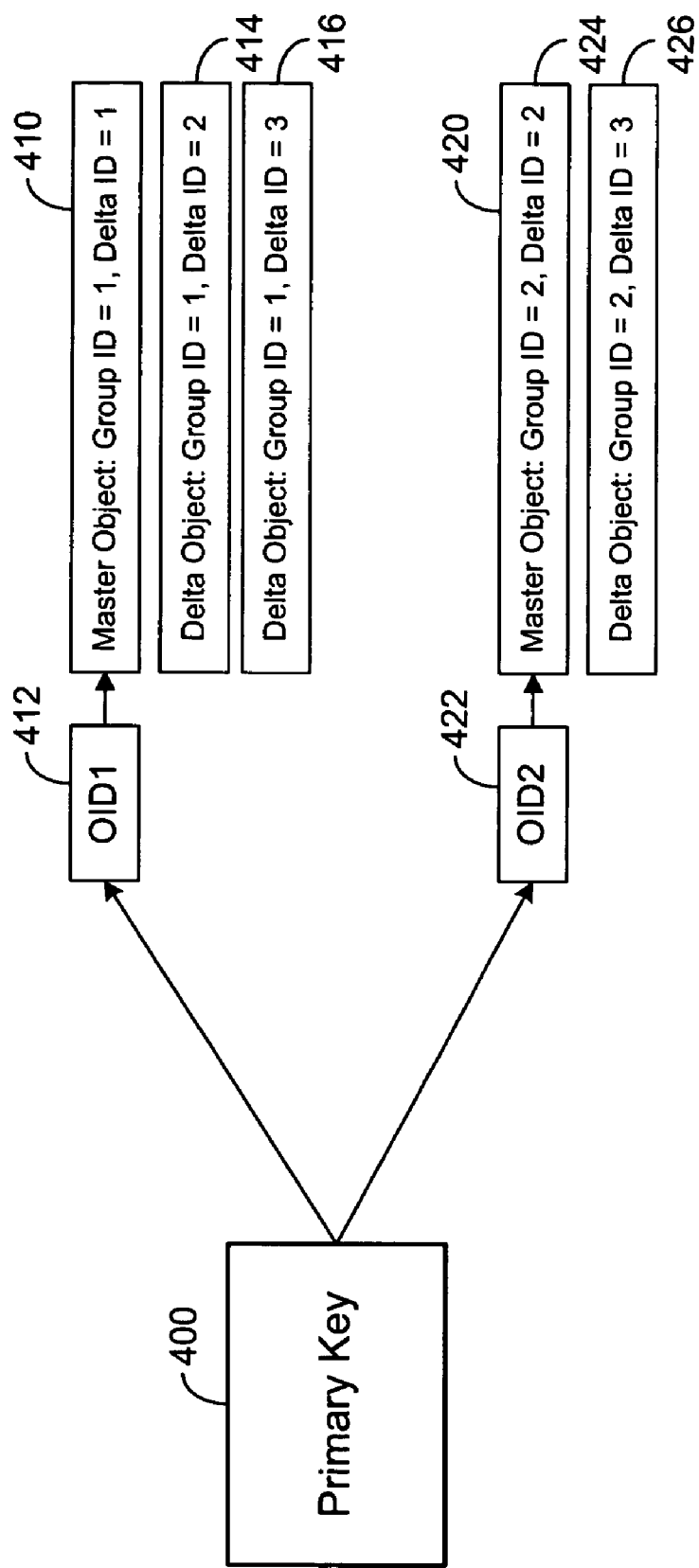
FIG. 5 illustrates relationships between a primary key, OIDs, master objects and delta objects according to some embodiments.

FIG. 5 illustrates the creation of delta objects associated with the master objects of FIG. 4. The delta ID of each delta object 414, 416 and 424 is incremented with respect to a previous delta object. As shown, de-referencing OIDs 412 and 422 provides access to objects 410 and 420, respectively, and does not provide direct access to any of objects 414, 416 and 424. Accordingly, delta objects 414, 416 and 424 may be invisible to application libraries 210.

Returning to process 300, a new master object is created at S380 is the determination at S360 is affirmative. The new master object is associated with the primary key of the object, a group ID that is incremented with respect to a last-created master object, and a delta ID equal to the incremented group ID. Flow returns to S340 from S380 to provide an OID associated with the newly-created master object and continues as described above.

Figure 6:
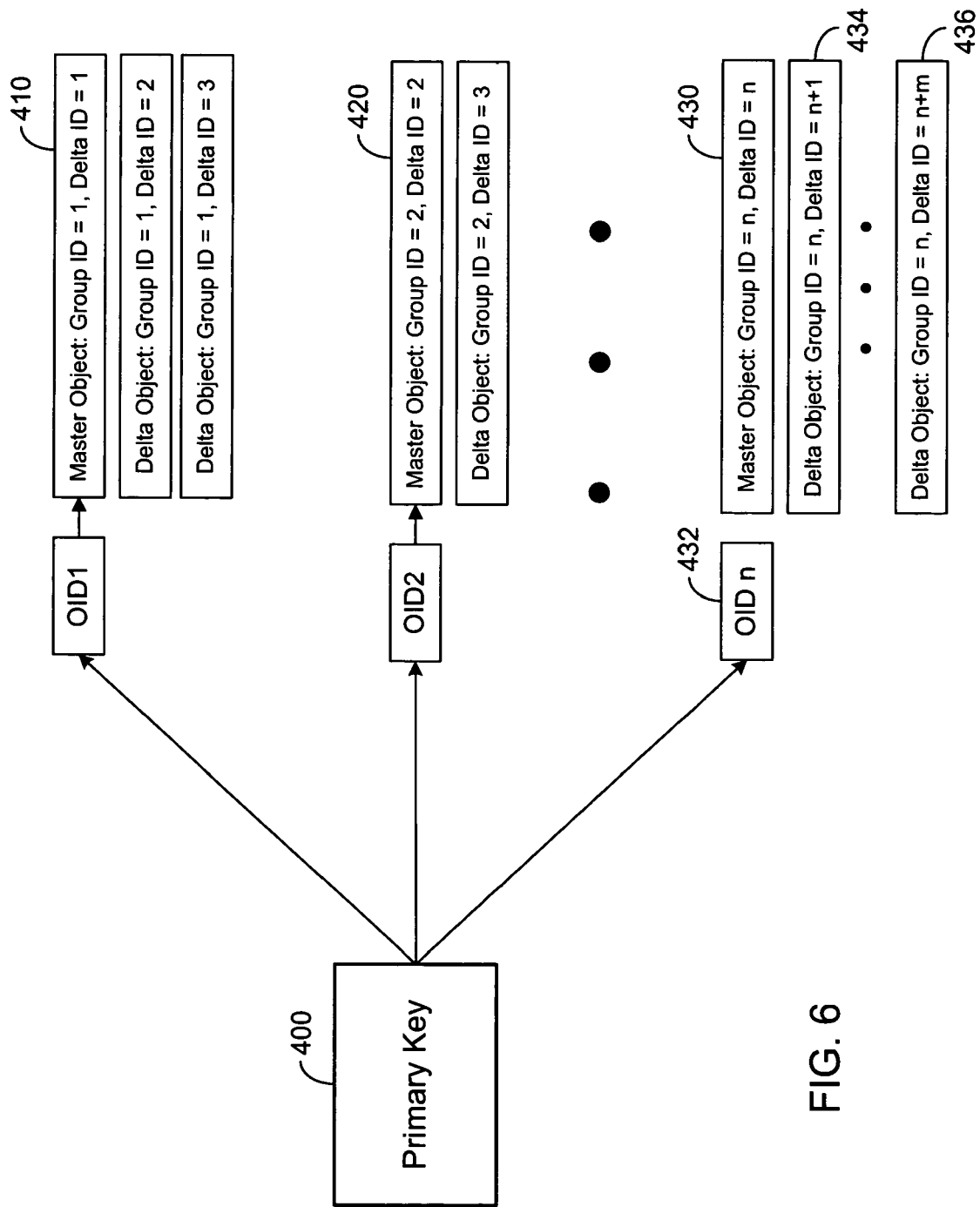
FIG. 6 illustrates relationships between a primary key, OIDs, master objects and delta objects according to some embodiments.

Process 300 may therefore be executed to create any number of master objects associated with a respective OID and with a single primary key, as well as any number of delta objects for each master object. FIG. 6 illustrates relationships between primary key 400, master objects 410 through 430, and associated delta objects according to some embodiments. Master object 430 represents any master object that may be created according to process 300, OID 432 represents a pointer referencing object 430, and delta objects 434 and 436 represent a 1st and an mth delta object of master object 430.

According to the FIG. 6 arrangement, a single OID may not be sufficient to reference all objects associated with a single primary key. For instance, a read operation using only OID 422 would yield an incomplete reading of the object associated with primary key 400. A read operation using primary key 400 may, however, correctly read the object by reading all related master and delta objects.

Figure 7:
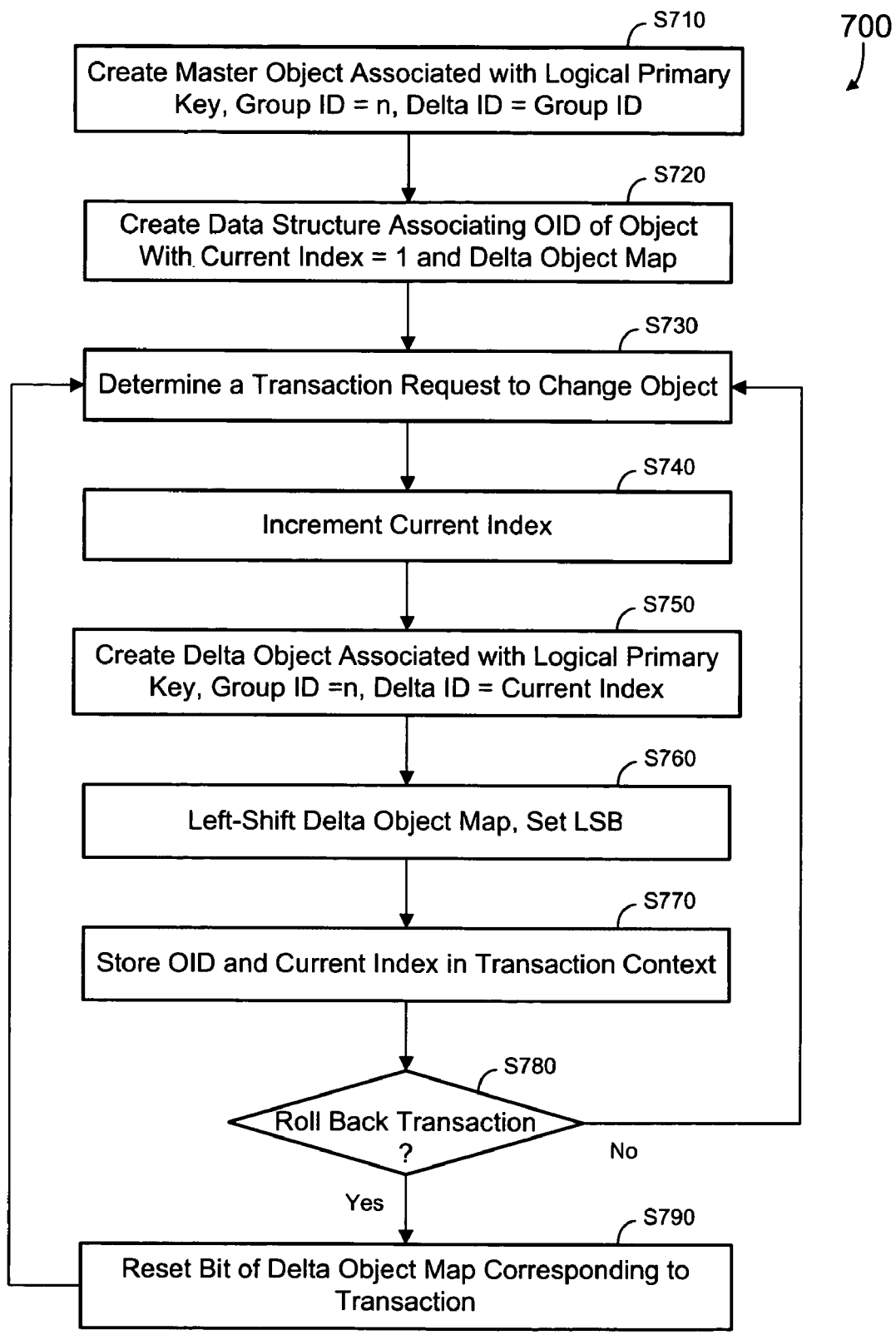
FIG. 7 is a flow diagram of program code according to some embodiments.

Different transactions may attempt to change or delete objects associated with OIDs generated as described above. FIG. 7 is a flow diagram of process 700 to provide primitives that may be used to synchronize OID-specific operations requested by different transactions. Process 700 concerns operations associated with a single OID, but may be performed in parallel with respect to any number of OIDs.

A master object is initially created at S710. As described with respect to S330 and S380, the master object is associated with the primary key of a database object of interest, a group ID and a delta ID equal to the group ID. As also described, creation of the master object results in creation of a pointer (i.e., an OID) referencing the master object.

Figure 8A:
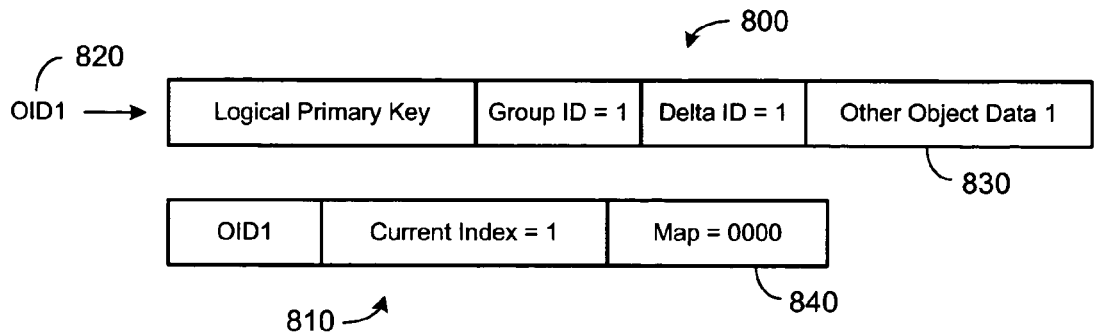
FIGS. 8A through 8D illustrate manipulation and usage of an index and delta object map according to some embodiments.

Next, at S720, a data structure is created associated the OID of the object with a current index equal to 1 and a delta object map. FIG. 8A illustrates master object 800 and associated data structure 810 according to some embodiments of process 700. Master object 800 is referenced by OID 820 and includes other object data 830 in addition to the aforementioned primary key, group ID and data ID.

Data structure 810 is accessible to all transactions according to some embodiments. For example, data structure 810 may be located within a shared memory of server 110 if each transaction runs in a different process on server 110. Alternatively, if the transactions run as multiple threads within one process, the data structure may exist in an address space of the process.

Delta object map 840 provides an indication of each existing delta object that is associated with master object 800. In the current example, the lack of set bits in map 840 indicates that no such delta objects exist.

A transaction request to change an object associated with the subject OID is then determined at S730. The transaction request may be received by the process executing process 700 or may otherwise be detected thereby. In response, the current index is incremented at S740 and a delta object is created at S750. The delta object is associated with the primary key of the object, the group ID of the master object created at S710, and a delta ID equal to the incremented current index.

Figure 8B:
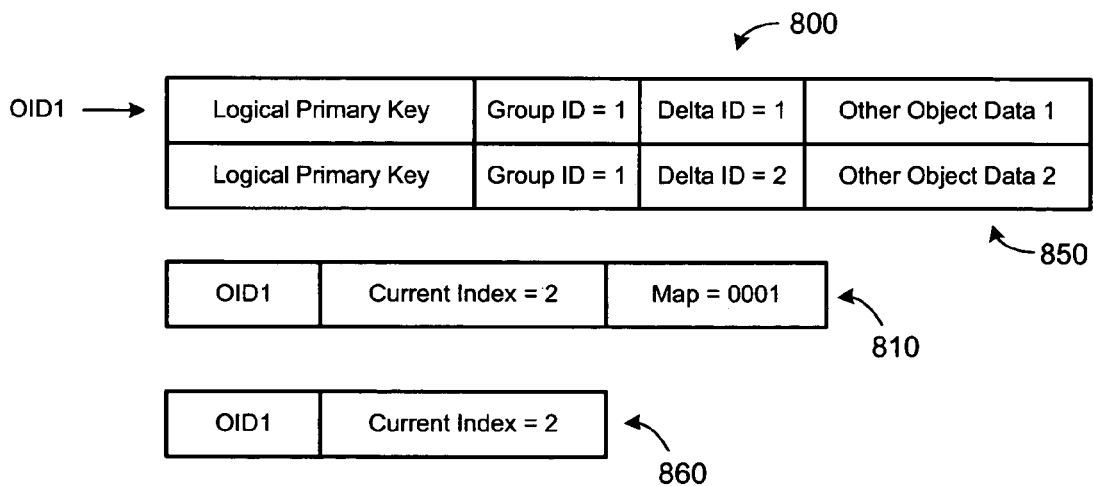

The delta object map is left-shifted and its least-significant bit is set at S760. Moreover, the OID and the current index are stored in a context of the requesting transaction at S770. FIG. 8B shows delta object 850 associated with a change to object 800, updated data structure 810, and data 860 stored in the transaction context at S770. The least-significant bit of delta object map 840 indicates the existence of delta object 850.

Figure 8C:
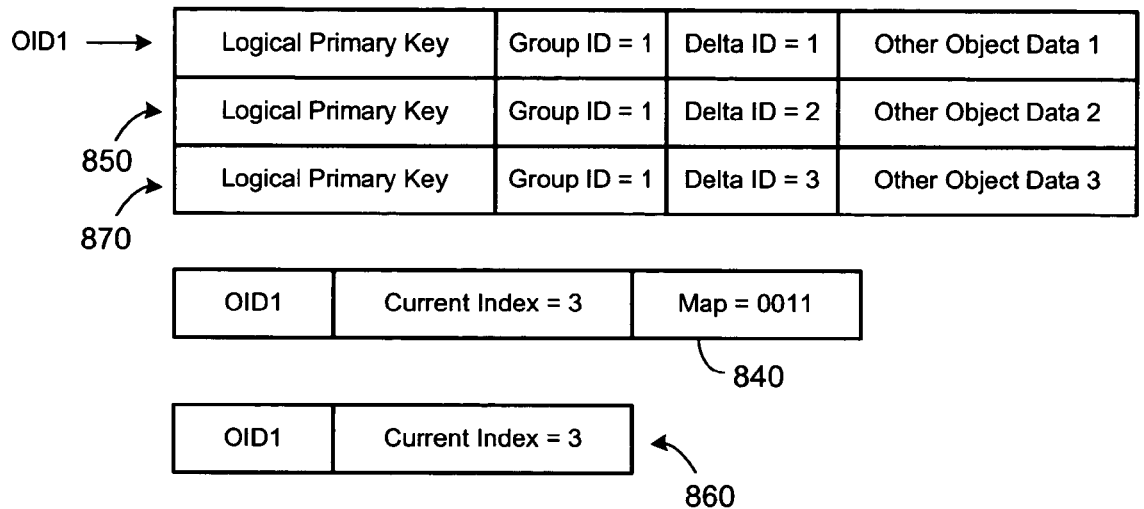

It is determined at S780 whether to rollback the pending transaction. If the determination is negative, the transaction is committed and flow returns to S730. Flow proceeds from S730 through S770 as described above to create a new delta object and to modify the data structure. FIG. 8C illustrates new delta object 870 including a delta ID equal to the incremented index and shows object map 840 now indicating delta objects 850 and 870. Also shown in FIG. 8C is data 860 including the OID and current index, and stored in a context of the current transaction.

Figure 8D:
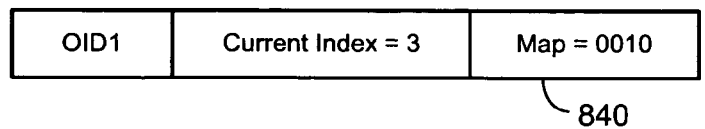

Flow may continue as described above with respect to a single OID. However, flow continues from S780 to S790 in case it is determined to roll back a pending transaction. For example, flow may proceed to S790 if it is determined to roll back the transaction associated with delta object 870. Accordingly, a bit of the delta object map corresponding to the transaction is reset at S790 and flow returns to S730. Accordingly, and as shown in FIG. 8D, a least-significant bit of object map 840 is reset so as to no longer indicate the existence of delta object 870.

Figure 9:
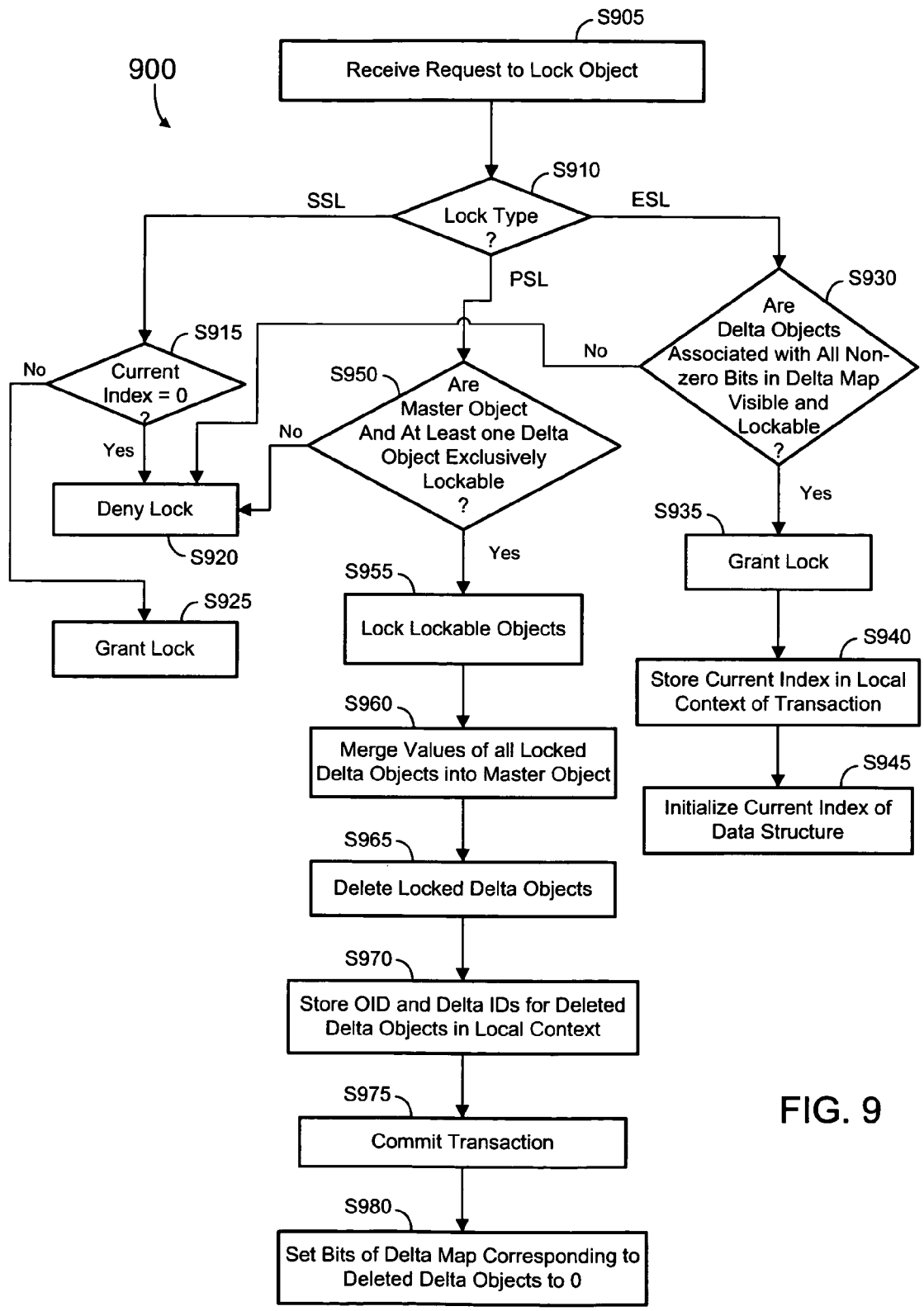
FIG. 9 is a flow diagram of program code according to some embodiments to provide object locking according to some embodiments.

FIG. 9 is a flow diagram of process 900 for using the above-described primitives to synchronize operations according to some embodiments. Process 900 involves three different types of locks: a shared sub-lock (SSL), an exclusive sub-lock (ESL), and a partial sub-lock (PSL). A transaction may be required to acquire an SSL in order to change an object, and an ESL to delete an object.

A transaction may acquire a PSL in order to merge delta objects into an associated master object. This merging may be used to reduce a number of persistent objects in object containers 252. According to some embodiments, a transaction attempts to obtain a PSL and merge delta objects prior to attempting to obtain a lock associated with a desired read, write or delete operation.

A request to lock an object is received at S905. The request may be received on behalf of a particular transaction by one of application libraries 210 and will be assumed to include an OID associated with a primary key of an object of interest. The type of the requested lock is determined at S910. If the requested lock is a SSL, it is determined at S915 whether the current index is equal to zero.

The requested lock may be a SSL if the requesting transaction seeks to change the subject object. The current index (e.g., as described with respect to FIG. 7) associated with the object is equal to zero only if no master object corresponding to the received OID exists. Accordingly, the lock is denied at S920 if the current index is equal to zero. However, in some embodiments, a new master object associated with the primary key and a new OID is created after the SSL is denied at S920. Accordingly, the requesting transaction may then perform its desired change operation with respect to the new master object.

The SSL is granted at S925 if the determination at S915 is negative. The requesting transaction may then proceed to generate a delta object reflecting a change to a master object associated with the received OID.

Flow proceeds to S930 from S910 if an ESL is requested. At S930, it is determined whether delta objects associated with all non-zero bits in an associated delta object map are visible and lockable. S930 may therefore comprise locating a data structure associated with the received OID such as structure 810 of FIGS. 8A through 8C. As described with respect thereto, each set bit of map 840 identifies a delta object associated with an OID. Some embodiments of S930 therefore comprise determining whether each thusly-identified delta object is visible and lockable.

If not, the ESL is denied at S920. If so, the ESL is granted at S935 and the current index of data structure 810 is stored in the local context of the requesting transaction at S940. Since granting of the ESL lock typically precedes deletion of the master object associated the OID, the current index of the data structure may be initialized at S945 (e.g., set to zero) to indicate that no delta objects are associated with the OID. Accordingly, the locally-stored instance of data structure 810 may be used to update the primary instance of data structure 810 in a case that the deleting transaction is rolled back.

Returning to S910, it may be determined that the requested lock is a PSL. If so, it is determined at S950 whether the master object associated with the subject OID and at least one corresponding delta object are exclusively lockable. The PSL is denied at S920 if the at least two objects are not exclusively lockable.

If the determination at S950 is affirmative, the master object and all the exclusively-lockable delta objects associated therewith are locked at S955. Next, at S960, values of each locked delta object are merged into the locked master object. As a result, the locked delta objects may be deleted at S965.

The OID received at S905 and the delta IDs for each deleted delta object are stored in a local context of the requesting transaction at S970, and the transaction is committed at S975. Finally, at S980, bits of the delta object map that correspond to the deleted delta objects are set to zero. The OID stored at S970 is used to access an associated data structure such as data structure 810, and the stored delta IDs are used to determine which bits of the delta object map should be set to zero.

The embodiments described herein are solely for the purpose of illustration. Those in the art will recognize that other embodiments may be practiced with modifications and alterations which are also encompassed by one or more of the following claims.

What is claimed is:

1. A method comprising:
    receiving, by an object management system, a first request to change a reference database object that is referenced by a primary key;
    after the receiving the first request to change the reference database object that is referenced by the primary key, determining, by the object management system, that the reference database object is not stored persistently;
    in response to the determining that the reference database object is not stored persistently after the receiving the first request to change the reference database object, creating, by the object management system, a first database object associated with the primary key, a first group ID m, and a first delta ID m;
    associating, by the object management system, a first pointer with the first database object;
    creating, by the object management system, a second database object associated with the primary key, a second group ID n, and a second delta ID n;
    associating, by the object management system, a second pointer with the second database object; and
    creating, by the object management system, a third database object associated with the primary key, the first group ID m, and a third delta ID m+1,
    wherein the third database object is associated with a change to the first database object; and
    wherein the first pointer references the first database object.

2. A method according to claim 1, further comprising:
    creating, by the object management system, a fourth database object associated with the primary key, the second group ID n, and a fourth delta ID n+1,
    wherein the fourth database object is associated with a change to the second database object.

3. A method according to claim 1, wherein the first pointer does not reference the third database object.

4. A method according to claim 1, wherein
    creating the second database object comprises creating the second database object if, after receiving a second request to change said another database object, it is determined that said another database object is not stored persistently.

5. A method according to claim 1, wherein creating the second database object comprises:
    receiving a request to change a database object associated with the first pointer; and
    determining that all database objects associated with the first pointer are locked and deleted.

6. A method according to claim 1, wherein creating the third database object comprises:
    receiving a request to change a database object associated with the first pointer.

7. A method according to claim 1, wherein creating the first database object comprises:
    creating a data structure associating the first pointer with an index m and a delta object map, and
    wherein creating the third database object comprises:
    determining a request from a transaction to change a database object associated with the first pointer;
    incrementing the index of the data structure;
    modifying the delta object map to indicate the third database object; and
    storing the first pointer in association with the incremented index in a context of the transaction.

8. A method according to claim 7, further comprising:
determining that the transaction is to be rolled back; and
modifying the delta object map to not indicate the third database object.

9. A method according to claim 7, further comprising:
receiving a request from a second transaction for an exclusive lock of the first database object;
determining whether all objects indicated by the delta object map are visible and lockable;
granting the exclusive lock of the first database object;
storing the current index of the data structure in a context of the second transaction; and
initializing the current index of the data structure.

10. A method according to claim 7, further comprising:
receiving a request for a shared lock of the first database object;
determining that the current index of the data structure is not equal to an initial index value; and
granting the shared lock of the first database object.

11. A method according to claim 7, further comprising:
receiving a request for a partial lock of the first database object from a second transaction;
determining that the first database object and one or more other database objects associated with the second pointer are visible and exclusively lockable;
merging the one or more other database objects into the first database object;
storing the first pointer and a delta ID of each of the one or more other database objects in a local context of the second transaction; and
modifying the delta object map so as to not indicate the one or more other database objects.

12. A method according to claim 1, wherein the first pointer may be used to request changes to the first database object.

13. A method according to claim 1, wherein the first database object includes the primary key.

14. A method according to claim 1, wherein the first database object includes the first delta ID.

15. A method according to claim 1, wherein the first database object includes the first group ID.

16. A method according to claim 1, wherein the first pointer may be used to request changes to the first database object, and wherein the first database object includes the primary key, the first group ID m, and the first delta ID m.

17. A non-transitory computer-readable storage medium storing program code, the program code comprising:
code to receive a first request to change a reference database object that is referenced by a primary key;
code to, after the reception of the first request to change the reference database object that is referenced by the primary key, determine that the reference database object is not stored persistently;
code to, in response to the determination that the reference database object is not stored persistently after the reception of the first request to change the reference database object, create a first database object associated with the primary key, a first group ID m, and a first delta ID m;
code to associate a first pointer with the first database object;
code to create a second database object associated with the primary key, a second group ID n, and a second delta ID n;
code to associate a second pointer with the second database object; and
code to create a third database object associated with the primary key, the first group ID m, and a third delta ID m+1,
wherein the third database object is associated with a change to the first database object; and
wherein the first pointer references the first database object.

18. A medium according to claim 17, the program code further comprising:
code to create a fourth database object associated with the primary key, the second group ID n, and a fourth delta ID n+1,
wherein the fourth database object is associated with a change to the second database object.

19. A medium according to claim 17, wherein the first pointer does not reference the third database object.

20. A medium according to claim 17, wherein the code to create the second database object comprises code to create the second database object if, after receiving a second request to change said another database object it is determined that said another database object is not stored persistently.

21. A medium according to claim 17, wherein the code to create the second database object comprises:
code to receive a request to change a database object associated with the first pointer; and
code to determine that all database objects associated with the first pointer are locked and deleted.

22. A medium according to claim 17, wherein the code to create the third database object comprises:
code to receive a request to change a database object associated with the first pointer.

23. A medium according to claim 17, wherein the code to create the first database object comprises:
code to create a data structure associating the first pointer with an index n and a delta object map, and
wherein the code to create the third database object comprises:
code to determine a request from a transaction to change a database object associated with the first pointer;
code to increment the index of the data structure;
code to modify the delta object map to indicate the third database object; and
code to store the first pointer in association with the incremented index in a context of the transaction.

24. A medium according to claim 23, the program code further comprising:
code to determine that the transaction is to be rolled back; and
code to modify the delta object map to not indicate the third database object.

25. A medium according to claim 23, the program code further comprising:
code to receive a request from a second transaction for an exclusive lock of the first database object;
code to determine whether all objects indicated by the delta object map are visible and lockable;
code to grant the exclusive lock of the first database object;
code to store the current index of the data structure in a context of the second transaction; and
code to initialize the current index of the data structure.

26. A medium according to claim 23, the program code further comprising:
code to receive a request for a shared lock of the first database object;
code to determine that the current index of the data structure is not equal to an initial index value; and
code to grant the shared lock of the first database object.

27. A medium according to claim 23, the program code further comprising:
code to receive a request for a partial lock of the first database object from a second transaction;
code to determine that the first database object and one or more other database objects associated with the first pointer are visible and exclusively lockable;
code to merge the one or more other database objects into the first database object;
code to store the first pointer and a delta ID of each of the one or more other database objects in a local context of the second transaction; and
code to modify the delta object map so as to not indicate the one or more other database objects.

28. A system comprising:
a non-transitory computer-readable medium storing program code;
an object-oriented database; and
an object management system to execute program code and to:
receive a first request to change a reference database object that is referenced by a primary key;
after the reception of the first request to change the reference database object that is referenced by the primary key, determine that the reference database object is not stored persistently;
in response to the determination that the reference database object is not stored persistently after the reception of the first request to change the reference database object, create a first database object in the object-oriented database, the first database object associated with the primary key, a first group ID m, and a first delta ID m;
associate a first pointer with the first database object;
create a second database object in the object-oriented database, the second database object associated with the primary key, a second group ID n, and a second delta ID n;
associate a second pointer with the second database object; and
create a third database object in the object-oriented database, the third database object associated with the primary key, the first group ID m, and a third delta ID m+1,
wherein the third database object is associated with a change to the first database object;
wherein the first pointer references the first database object.

29. A system according to claim 28, wherein the first pointer does not reference the third database object.

30. A system according to claim 28, wherein creation of the second database object comprises:
reception of a request to change a database object associated with the first pointer; and
determination that all database objects associated with the first pointer are locked and deleted.

31. A system according to claim 28, wherein creation of the third database object comprises:
reception of a request to change a database object associated with the first pointer.

32. A system according to claim 28, wherein the object management system executes the program code to:
create the first database object;
associate the first pointer with the first database object;
create the second database object;
associate the second pointer with the second database object; and
create the third database object.

33. A non-transitory computer-readable storage medium storing program code, the program code executable by a processor to result in the following:
receiving a first request to change a reference database object that is referenced by a primary key;
after the receiving the first request to change the reference database object that is referenced by the primary key, determining that the reference database object is not stored persistently;
in response to the determining that the reference database object is not stored persistently after the receiving the first request to change the reference database object, creating a first database object associated with the primary key, a first group ID m, and a first delta ID m;
associating a first pointer with the first database object;
creating a second database object associated with the primary key, a second group ID n, and a second delta ID n;
associating a second pointer with the second database object; and
creating a third database object associated with the primary key, the first group ID m, and a third delta ID m+1,
wherein the third database object is associated with a change to the first database object; and
wherein the first pointer references the first database object.

34. A non-transitory computer-readable storage medium storing program code, the program code executable by object management system to result in the following:
receiving, by the object management system, a first request to change a reference database object that is referenced by a primary key;
after the receiving the first request to change the reference database object that is referenced by the primary key, determining, by the object management system, that the reference database object is not stored persistently;
in response to the determining that the reference database object is not stored persistently after the receiving the first request to change the reference database object, creating, by the object management system, a first database object associated with the primary key, a first group ID m, and a first delta ID m;
associating, by the object management system, a first pointer with the first database object;
creating, by the object management system, a second database object associated with the primary key, a second group ID n, and a second delta ID n;
associating, by the object management system, a second pointer with the second database object; and
creating, by the object management system, a third database object associated with the primary key, the first group ID m, and a third delta ID m+1,
wherein the third database object is associated with a change to the first database object; and
wherein the first pointer references the first database object.

* * * * *